Aug. 29, 1939.  L. J. DE LANTY  2,170,964
DEVICE FOR CONTROLLING ELECTRIC CIRCUITS
Filed Oct. 21, 1936  2 Sheets-Sheet 1
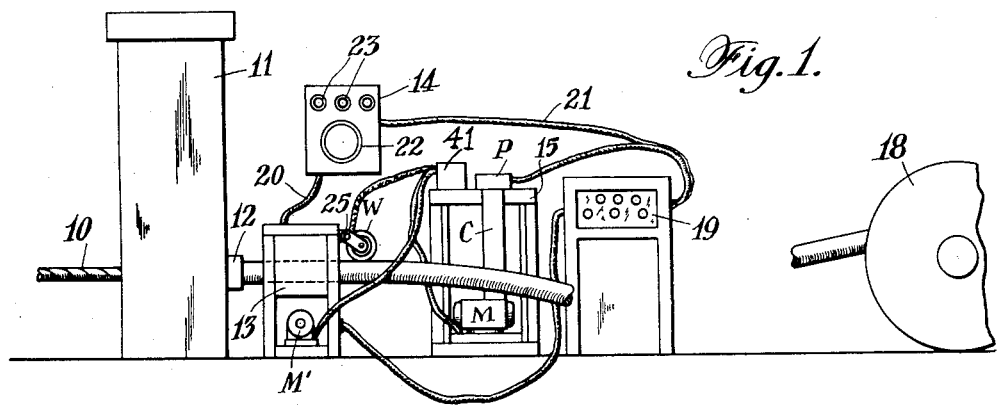
Fig. 1.
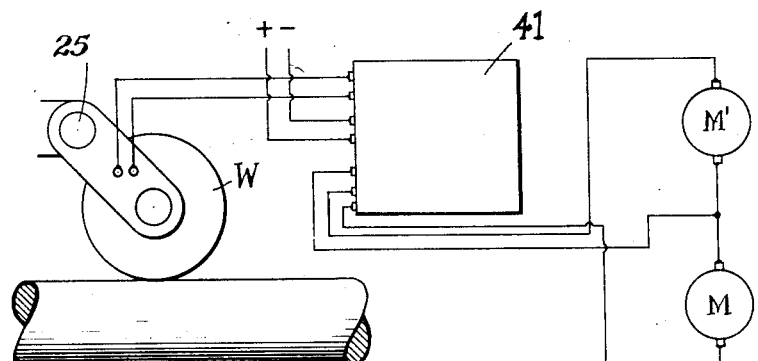
Fig. 2.
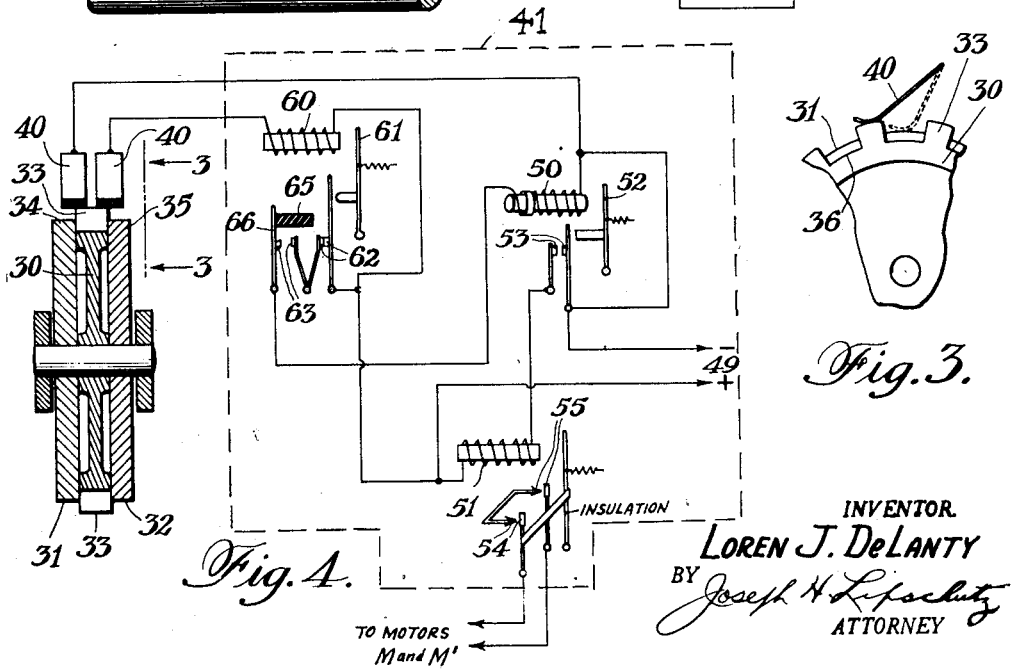
Fig. 3.
Fig. 4.
INVENTOR.
LOREN J. DeLANTY
BY Joseph H. Lipschutz
ATTORNEY Aug. 29, 1939.　　　　L. J. DE LANTY　　　　2,170,964
DEVICE FOR CONTROLLING ELECTRIC CIRCUITS
Filed Oct. 21, 1936　　　2 Sheets-Sheet 2

INVENTOR.
LOREN J. DE LANTY
BY
ATTORNEY

Patented Aug. 29, 1939

2,170,964

UNITED STATES PATENT OFFICE 2,170,964

DEVICE FOR CONTROLLING ELECTRIC CIRCUITS

Loren J. De Lanty, Brooklyn, N. Y., assignor to Sperry Products, Inc., Brooklyn, N. Y., a corporation of New York Application October 21, 1936, Serial No. 106,852

14 Claims. (Cl. 175—183)

This invention relates to devices for controlling electric circuits in response to movement of an object. More particularly, the invention is disclosed in the present application as applied to testing mechanism for detecting flaws and eccentricities in the lead sheaths which surround cables as the said sheath-covered cables come out of the lead press. The said testing device is adapted to encircle the lead sheath and to traverse a circular path around the circumference of the sheath as the sheath moves axially through the testing mechanism. As a result, the testing mechanism describes a spiral path around the cable. A motor drives the testing mechanism in its path around the cable and it will readily be appreciated that if for some reason the test mechanism did not start to rotate around the cable when the cable moved axially therethrough, the contact members of the test mechanism which engage the cable would score and otherwise damage the surface of the cable, due to drag, without rotation, on the moving sheath. An equally important reason for immediate starting is that all of the cable sheath passing through the machine must be tested, and this would not be the case if the contacts did not rotate. It is the principal object of this invention, therefore, to provide an automatic control mechanism whereby the rotation of the test contacts would be ensured as soon as the cable begins its axial movement out of the press and through the test mechanism, and immediate discontinuance of rotation of said contacts would be ensured after cessation of axial movement of the cable.

It is a further object of this invention to provide said automatic circuit control mechanism which will not only ensure the rotation of the test mechanism when the cable starts its axial movement, but which will stop the said mechanism as soon as the movement of the cable ceases. This is also essential since otherwise the rotary movement of the test mechanism around the stationary cable would cause scoring and damage to the cable.

Further objects and advantages of this invention will become apparent in the following detailed description thereof.

In the accompanying drawings:

Fig. 1 is an assembly view showing my invention embodied in a lead sheath testing mechanism.

Fig. 2 is a wiring diagram showing an impulse-generating mechanism and mechanism controlled thereby.

Fig. 3 is a side elevation showing a portion of the impulse-generating mechanism.

Fig. 4 is an assembly showing a vertical section through the impulse-generating mechanism and the circuits controlled thereby.

Figure 5:
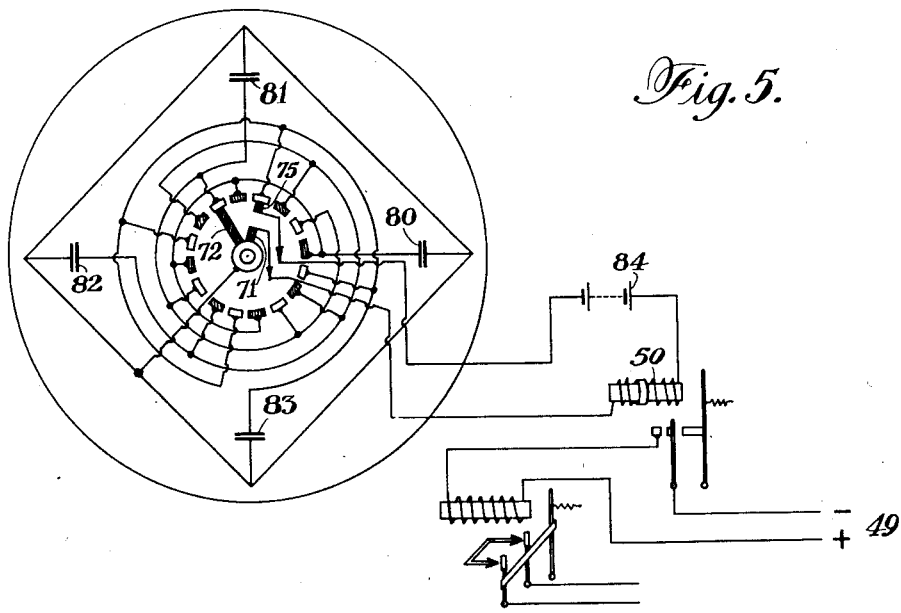
Fig. 5 is a view similar to Fig. 4 but showing a modified form of impulse-generating mechanism.

Referring first to Fig. 1, it will be understood that my invention is capable of various applications but I have shown a general assembly of one application of my invention, namely, the application to the test mechanism adapted to be applied to the testing of lead sheath cable as the said cable is extruded from the press. In this application of the invention, it will be seen that unsheathed cable 10 is passed through a lead press 11 and is extruded from a die 12 as lead-sheath-covered cable. This sheath frequently is found to be eccentric, that is, thicker in one portion of the circumference than in another, and such variations in thickness are undesirable since they constitute points of weakness. The said lead-sheathed cable, after being extruded from the die 12, is therefore caused to pass through a testing mechanism 13 which is designed to detect the eccentricity and indicate the same upon a visual indicator 14 and upon a recording tape C passing over a recording table 15. The sheathed cable is then passed through a quenching tank and finally onto a reel 18.

The test mechanism may be as shown in the patent of Elmer A. Sperry, Jr., and Francis H. Shepard, No. 2,133,725, granted October 18, 1938, and may comprise means for passing current into the lead sheath, as for instance by induction coils, and a detector mechanism in the form of one or more pairs of contacts adapted to engage the sheath and to be rotated around the circumference thereof as the sheath moves axially through the test mechanism 13. The contacts will pick off the potential drop from point to point and any variation in potential drop due to a variation in thickness of the lead sheath is amplified by any suitable thermionic amplifier 19, the output of which is caused to operate a pen P on a moving chart C, the said chart being moved at a constant speed by motor M.

The output of the amplifier is also caused to operate the visual indicator which consists of two parts, one mechanically actuated through mechanical drives 20 in synchronism with the rotation of the contacts, and the other part being electrically controlled by the output from the amplifier through connection 21. The indicator may be as described in the patent to Fred B. Braddon and Alfred N. Lawrence, No. 2,003,336, granted June 4, 1935, and may have two parts, one part 22 showing the exact position of the eccentricity with respect to the circumference of the cable, and another part 23 showing the degree of eccentricity in terms of percent.

From the above outline of the lead sheath cable testing mechanism now in commercial use and known as the Sperry detector for lead sheath, it becomes apparent that the test contacts which engage the cable and rotate around the circumference thereof must necessarily produce a slight scoring of the lead sheath, since this is incident to effecting a firm contact. Also, it must be appreciated that the contacts at all times must be held in firm contact with the periphery of the lead cable. If it is attempted to move the cable through the test mechanism without rotating the contacts it will be apparent that severe scoring of the cable will take place. In other words, if the test contacts are not set into rotation at substantially the same time that the cable starts its axial movement through the test mechanism, then there will be severe longitudinal scoring of the cable. Therefore, it is important that the motor M' which rotates the contacts around the circumference of the cable to be started promptly when the cable commences its axial movement through the test mechanism. Also, it will be appreciated that should the cable cease its axial movement through the test mechanism but the motor M' remain energized to continue the rotation of the test contacts, then said contacts would deeply score the cable circumferentially by reason of the fact that they run repeatedly in the same tracks. It is therefore highly desirable that the contacts cease rotating at substantially the same time that the cable ceases its axial movement. Also, since the recording tape should move in synchronism with the movement of the cable, it is desirable that the motor M which controls the movement of the chart be started when the axial movement of the cable commences and be stopped when the said axial movement ceases.

To accomplish all of the aforesaid objects, namely, to start motor M' and the rotation of the test contacts as soon as the axial movement of the cable commences and to stop said motor and said rotation of the test contacts as soon as said cable ceases its axial movement, as well as to start and stop motor M and hence the movement of chart C in synchronism with the movement of the cable, I have provided several forms of my invention, all of which, however, operate upon the same general principle, as will now become apparent from the detailed description.

Every form of my invention depends upon the axial movement of the cable causing a series of electric impulses to be transmitted, which impulses are integrated to give one continuous output sufficient to keep the circuit through the driving motors closed. Said impulses cease being transmitted when the movement of the cable ceases and hence the motor circuits are opened.

In one form of my invention, disclosed in Figs. 1 to 4, inclusive, a wheel W is suspended on test mechanism 13 for movement about a transverse axis 25 so that said wheel is free to rest upon the surface of the cable as it emerges from the test mechanism 13. Therefore, as the cable starts its movement through the mechanism 13, wheel W will be rotated and such rotation is caused to transmit a plurality of impulses by reason of the following construction. Said wheel may be composed of a central gear wheel 30 enclosed between two plates 31 and 32. The said wheel 30 has electric conducting teeth 33 which project above the periphery 34, 35 of the plates 31, 32. The spaces between adjacent gear teeth form a depression, the bottom 36 of which is below the said peripheries 34, 35 of the outside plates. The teeth 33 are electric conductors while the plates 31, 32 are of insulating material such as Bakelite. Spaced contact fingers 40 are designed to ride on the teeth 33 and into the depressions 36 and it will be readily appreciated that as the wheel W rotates, fingers 40 will first engage a tooth 33 and will then tend to drop into the space 36. The contacts 40 are, however, so positioned that instead of dropping to the bottom of depression 36, they will rest upon the peripheries 34 and 35 of the insulator plates, as shown in the dotted line position in Fig. 3. If, now, the contact fingers 40 and the gear 30 are placed in an electric circuit, it is apparent that the circuit, including a source of E. M. F. 49, will be completed each time the fingers 40 ride upon a gear tooth 33 and said circuit will be broken each time the fingers drop into engagement with the insulator plates in the space between adjacent gear teeth. Therefore, as wheel W rotates, a series of impulses may be transmitted by engagement of fingers 40 with the successive gear teeth 33 to an automatic control unit 41 comprising the elements disclosed in detail in Fig. 4.

In order that the impulses generated from rotating wheel W may control the circuit through motors M and M' it is necessary that these impulses be integrated to give one continuous output sufficient to keep the circuit through the said motors closed. For this purpose, there is positioned in the circuit which includes the contact 40 and gear teeth 33, a source of current supply 49, and delayed-action relay 50 which is designed to make quickly and break slowly, and which is energized every time contact fingers 40 engage a gear tooth 33. Since the relay 50 is of the delayed action type, it will remain energized for a sufficient interval after fingers 40 have left one tooth 33 until the said fingers engage the next tooth 33 for the normal rate of axial movement of the lead sheath cable and, therefore, the normal rate of rotation of wheel W. In other words, the relay 50 will be energized a second time before it has an opportunity to be de-energized by reason of the fingers 40 leaving the preceding tooth 33. As a result, relay 50 will remain energized as long as wheel W is rotating, and it will readily be seen that as long as relay 50 is continuously energized it may be utilized to control the circuits through motors M and M' either directly or, if the voltage in the motor circuits is high, through a power relay 51, as shown. Such control may be effected by causing relay 50 to attract its armature 52 to close contacts 53 to energize the power relay 51 which acts in the usual way to close multiple sets of contacts 54, 55, capable of controlling large currents through the motors M and M'.

From the above description it will become apparent that as long as wheel W is rotating, that is, as long as there is axial movement of the cable, the motors M and M' will be energized to cause movement of chart C and rotation of the test contacts. As soon as the rotation of wheel W ceases, the impulses to relay 50 cease and said relay releases it armature 52 to open contacts 53 to de-energize the power relay and break the circuits through motors M and M'.

It will be seen that should the wheel W stop in such position that contact fingers 40 remain in engagement with a gear tooth 33, the circuit through relay 50 would remain permanently energized and the motors M and M' would continue to operate. To obviate such an occurrence, I provide in the circuit between contacts 40, 33 and relay 50, another relay 60 of the "make-before-break" type. The operation of said relay is as follows: When an impulse passes through relay 60 it attracts its armature 61 to cause contacts 62 to engage, and upon further movement of armature 61 contacts 63 are caused to engage to close the circuit through relay 50. Further movement of armature 61 causes said armature to engage a member 65 which is also in engagement with member 66 carrying one of the contacts 63, so that the final movement of armature 61 serves to break contacts 63 and therefore de-energize relay 50. If, therefore, the wheel should stop with contacts 40 and 33 in engagement it will be seen that this will not result in continuous energization of relay 50 because after the predetermined energization of relay 60, armature 61 will cause contacts 63 to open and break the circuit through relay 50. There is therefore provided in this "make-before-break" relay inserted in series with relay 50, a device for preventing an impulse of longer than a predetermined duration from reaching relay 50, and therefore stoppage of contact fingers 40 on tooth 33 will not result in prolongation of the energization of motors M and M'. The constants of elements 60, 33, 40 and 50 are so chosen that the device operates between predetermined upper and lower limits of rate of movement of the cable. The constants are such that the device operates at any speed above a predetermined minimum which is very near stand-still, and below a predetermined upper speed limit which is well above the highest operating speed. Above this speed limit the impulses transmitted by relay 50 are of such duration that they do not allow sufficient energy to be built up to establish the required pull on elements 61.

Figure 6:
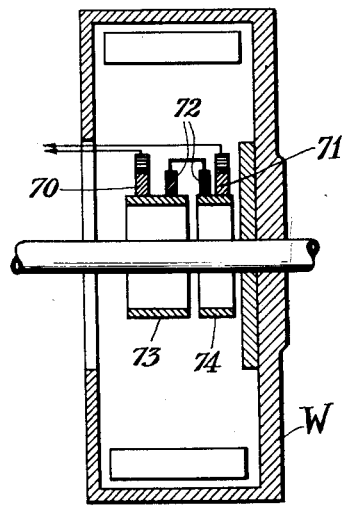
Fig. 6 is a vertical section through the impulse-generating mechanism employed in Fig. 5.

In another form of my invention, illustrated in Figs. 5 and 6, I have shown the wheel W as carrying segmented commutator 73 and slip ring 74, while contact brushes 70, 71 and 72 are held stationary and in engagement with the commutator and slip ring. The number of segments in the said commutator may be chosen to fit the needs of each particular case, but in the form I have illustrated there are 16 divided in groups of 4 electrically interconnected series, each group of 4 being connected separately to condensers 80, 81, 82 and 83. The brushes 70 and 71 are, as shown in Fig. 5, connected to a source of voltage 84 so that each time brush 70 engages one of the contact segments it will charge one of the condensers. In practice, the voltage shown as supplied from separate source 84 may be taken off the main supply 49. In so charging the condenser, there is a definite current impulse which continues until the condenser is fully charged, and said impulse may be caused to pass through delayed-action relay 50 as before. In this instance, the interposition of "make-before-break" relay 60 is not necessary, since even if the brushes remain in contact with any of the segments, only an impulse of definite interval will be generated, that is, current will flow until the condenser is charged, and no further. It will be seen by reference to Fig. 5 that the sequence is such that once a condenser is charged it remains charged until a predetermined degree of movement of the wheel W has brought the short-circuit brushes 72 into circuit with the said charged condenser to discharge the same. Thus, in the position shown in Fig. 5, the brushes 70 and 71 are causing the condenser 83 to be charged. As the wheel moves in the direction of the arrow the next movement brings said brushes 70 and 71 into engagement with the contact segment which causes the condenser 82 to be charged. In the next movement, condenser 81 is charged but at the time that said condenser 81 is charged, brushes 72 short-circuit condenser 83 to discharge the same. In the next movement, condenser 80 is charged and condenser 82 is discharged. This cycle continues throughout the movement of wheel W. It will be seen that successive impulses are transmitted to relay 50 due to the successive charging of the condensers, but it will be apparent that the device could be arranged to operate equally well to energize relay 50 on the successive discharge of the condensers. Also, by means of an additional winding on relay 50, and an additional commutator, both the charging and discharging impulses can be employed.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device for controlling an electric circuit in response to movement of an object, comprising a normally open circuit, means whereby the movement of said object generates a plurality of electric impulses in said second circuit, and means whereby said impulses open and close the first electric circuit.

2. A device for controlling an electric circuit in response to movement of an object, comprising a normally open circuit, means whereby the movement of said object generates a plurality of periodic electric impulses in said second circuit, and means whereby said impulses open and close the first electric circuit.

3. A device for controlling an electric circuit in response to movement of an object, comprising a normally open circuit, means whereby the movement of said object generates a plurality of electric impulses in said second circuit, means for integrating said impulses, and means whereby said integrated impulses open and close the first electric circuit.

4. A device for controlling an electric circuit in response to movement of an object comprising a normally open circuit, means whereby the movement of said object generates a plurality of periodic electric impulses in said second circuit, means for integrating said impulses, and means whereby said integrated impulses open and close the first electric circuit.

5. A device for controlling an electric circuit in response to movement of translation of an object, comprising means adapted to be moved by the movement of translation of said object, means whereby movement of said movable means generates a plurality of electric impulses, and means whereby said impulses open and close the electric circuit.

6. A device for controlling an electric circuit in response to movement of translation of an object, comprising means adapted to be moved by the movement of translation of said object, means whereby movement of said movable means generates a plurality of periodic electric impulses, and means whereby said impulses open and close the electric circuit.

7. A device for controlling an electric circuit in response to movement of translation of an object, comprising means adapted to be moved by the movement of translation of said object, means whereby movement of said movable means generates a plurality of electric impulses, means for integrating said impulses, and means whereby said integrated impulses open and close the electric circuit.

8. A device for controlling an electric circuit in response to movement of translation of an object, comprising means adapted to be moved by the movement of translation of said object, means whereby movement of said movable means generates a plurality of periodic electric impulses, means for integrating said impulses, and means whereby said integrated impulses open and close the electric circuit.

9. In a testing mechanism, a lead sheath cable, said mechanism including an electric circuit, an operating motor in said circuit flaw detector means, and means whereby said motor rotates said detector means around said cable, a device for controlling said circuit in response to movement of the cable, said device comprising a member adapted to be moved by the movement of said cable, means whereby movement of said member generates a plurality of electric impulses, and means whereby said impulses open and close said circuit.

10. In a testing mechanism, a lead sheath cable, said mechanism including an electric circuit, an operating motor in said circuit flaw detector means, and means whereby said motor rotates said detector means around said cable, a device for controlling said circuit in response to movement of the cable, said device comprising a member adapted to be moved by the movement of said cable, means whereby movement of said member generates a plurality of periodic electric impulses, and means whereby said impulses open and close said circuit.

11. In a testing mechanism, a lead sheath cable, said mechanism including an electric circuit, an operating motor in said circuit flaw detector means, and means whereby said motor rotates said detector means around said cable, a device for controlling said circuit in response to movement of the cable, said device comprising a member adapted to be moved by the movement of said cable, means whereby movement of said member generates a plurality of electric impulses, means for integrating said impulses, and means whereby said integrated impulses open and close the electric circuit.

12. In a testing mechanism, a lead sheath cable, said mechanism including an electric circuit, an operating motor in said circuit flaw detestor means, and means whereby said motor rotates said detector means around said cable, a device for controlling said circuit in response to movement of the cable, said device comprising a member adapted to be moved by the movement of said cable, means whereby movement of said member generates a plurality of periodic electric impulses, means for integrating said impulses and means whereby said integrated impulses open and close the electric circuit.

13. In a testing mechanism, a lead sheath cable, said mechanism including an electric circuit, an operating motor in said circuit flaw detector means, and means whereby said motor rotates said detector means around said cable, a device for controlling said circuit in response to movement of the cable, said device comprising a member adapted to be moved by the movement of said cable, an electric impulse generating circuit adapted to be alternately energized and de-energized as said member is moved, means whereby said impulses open and close said motor circuit, and means for breaking said generating circuit after a predetermined interval of energization thereof.

14. In a testing mechanism, a lead sheath cable, said mechanism including an electric circuit, an operating motor in said circuit flaw detector means, and means whereby said motor rotates said detector means around said cable, a device for controlling said circuit in response to movement of the cable, said device comprising a member adapted to be moved by the movement of said cable, an electric impulse generating circuit adapted to be alternately energized and de-energized as said member is moved, means whereby said impulses open and close said motor circuit, and means including a "make-before-break" relay for breaking said generating circuit after a predetermined interval of energization thereof.

LOREN J. DE LANTY.